United States Patent [19]

Hamed et al.

[11] Patent Number: 4,728,137

[45] Date of Patent: Mar. 1, 1988

[54] COMPOUND TOGGLE ROBOTIC GRIPPER

[75] Inventors: Nihad Hamed, Pontiac; Hazem Hamed, Westland, both of Mich.

[73] Assignee: American Engineering and Trade, Inc., Redford Township, Wayne County, Mich.

[21] Appl. No.: 888,145

[22] Filed: Jul. 22, 1986

[51] Int. Cl.⁴ ............................................. B25J 15/08
[52] U.S. Cl. .................................. 294/88; 269/228; 294/115; 901/37
[58] Field of Search ................... 294/88, 97, 106, 115, 294/116, 119, 119.1; 269/32, 34, 228; 901/31, 32, 36-39

[56] References Cited

U.S. PATENT DOCUMENTS

| | | | |
|---|---|---|---|
| 2,817,254 | 12/1957 | Barnes et al. | 294/88 X |
| 2,908,114 | 10/1959 | Fouse | 269/34 X |
| 3,469,879 | 9/1969 | Tezuka | 294/106 |
| 3,512,824 | 5/1970 | Bautz et al. | 294/115 |
| 3,927,424 | 12/1975 | Itoh | 294/106 X |
| 4,368,913 | 1/1983 | Brockmann et al. | 294/88 X |

FOREIGN PATENT DOCUMENTS

| | | | |
|---|---|---|---|
| 2449750 | 5/1975 | Fed. Rep. of Germany | 294/115 |
| 69152 | 6/1977 | Japan | 294/88 |
| 825553 | 12/1959 | United Kingdom | 294/106 |
| 642151 | 1/1979 | U.S.S.R. | 294/88 |
| 992388 | 2/1983 | U.S.S.R. | 294/106 |
| 1206080 | 1/1986 | U.S.S.R. | 294/88 |

Primary Examiner—Johnny D. Cherry
Attorney, Agent, or Firm—Brooks & Kushman

[57] ABSTRACT

A compound toggle robotic gripper mechanism employs a pair of spaced, opposed gripping jaws, each pivotally mounted to a base and interconnected to an actuator, such as a hydraulic cylinder-piston assembly, by a compound toggle mechanism. The compound toggle mechanism preferably includes a first toggle interconnecting the actuator and second and third toggles. The second and third toggles interconnect the actuator through the first toggle to each of the spaced, opposed gripping jaws respectively so that extension of the actuator rod urges the first, second and third toggles from their released positions simultaneously into a locking position as the gripping jaws are moved into gripping engagement of a workpiece or tool.

10 Claims, 10 Drawing Figures

COMPOUND TOGGLE ROBOTIC GRIPPER

FIELD OF THE INVENTION

The present invention relates generally to robotics and, more particularly, to robotic gripping mechanisms.

BACKGROUND OF THE INVENTION

The "hands" of industrial robots typically comprise a pair of spaced, opposed gripping jaws, with one or both of the gripping jaws pivotally mounted to a base. One or both of the gripping jaws is also connected to an actuating mechanism, such as the piston rod of a hydraulic cylinder-piston assembly. Thus, displacement of the movement of the piston rod resulting from displacement of the piston within the cylinder provides the activating force for opening or closing the gripping jaws.

U.S. Pat. No. 3,945,676, issued to Asamoto, discloses a gripping device for use in an industrial robot or manipulator including a pair of clamp arms mounted on the base plate and connected to an activating rod through a single toggle mechanism comprising a pair of links each pivotally mounted at one end for concurrent movement to the activating rod, with the free end of each link pivotally mounted to each of the clamp arms respectively, providing for a locking closure of the clamping arms upon extension of the activating rod.

The employment of a toggle mechanism in the Asamoto device provides a simple locking mechanism with a degree of mechanical advantage. However, existing robot gripping mechanisms often lack sufficient gripping forces to safely secure relatively heavy workpieces which often have large deviations in size from piece to piece.

SUMMARY OF THE INVENTION

One object of the present invention is to provide a robotic gripper capable of holding a workpiece or tool weighing on the order of tens of times the weight of the gripper.

It is another object of the present invention to provide a robotic gripper which quickly and securely locks in gripping position.

The robotic gripper of the present invention comprises a pair of spaced, opposed gripping jaws which are activated to close in locking engagement with a workpiece or tool by an actuator which is interconnected to the jaws by a compound toggle mechanism.

The compound toggle mechanism preferably includes a first toggle interconnecting the actuator and second and third toggles. The second and third toggles interconnect the activating means through the first toggle to each of the spaced, opposed gripping jaws respectively. The actuator typically comprises a hydraulic cylinder-piston assembly wherein the extension of the piston rod urges the first toggle, and indirectly, the second and third toggles, from their released position simultaneously into a locking position as the gripping jaws are moved into gripping engagement of the workpiece or tool.

Each of the toggles include a pair of arms pivotally joined at one end for movement from a folded, released position overcenter to a locked position. Once in the locked position, a deactivating force, sufficient to move the hinge of the toggles back overcenter, must be applied in order to unclamp the gripping jaws. In the preferred embodiment, each of the toggle arms is a generally planar link. However, other types of toggle mechanisms, such as roller toggles employing a link pivotally joined to a rotating cylinder, may be employed without departing from the spirit of the invention.

In an alternative embodiment of the present invention the second and third toggles interconnect the first toggle and first and second sets of pivoting members each pivotally connected to the first and second gripping jaws respectively to ensure that the gripping surfaces of the jaws remain parallel to each other throughout the entire range of their motion.

The substantially increased forces achieved due to the higher mechanical advantage inherent in the compound toggle mechanism provides a gripper capable of exerting a substantial gripping force on a workpiece or tool. Also, the compound locking capability of the compound toggle mechanism ensures that substantially greater gripping forces are rigidly maintained until the necessary deactivating force is applied releasing the locked toggles to the gripper, thereby preventing slippage of the workpiece or tool in the event of a fluid pressure loss.

DETAILED DESCRIPTION OF THE PREFERRED EMBODIMENT

Figure 1:
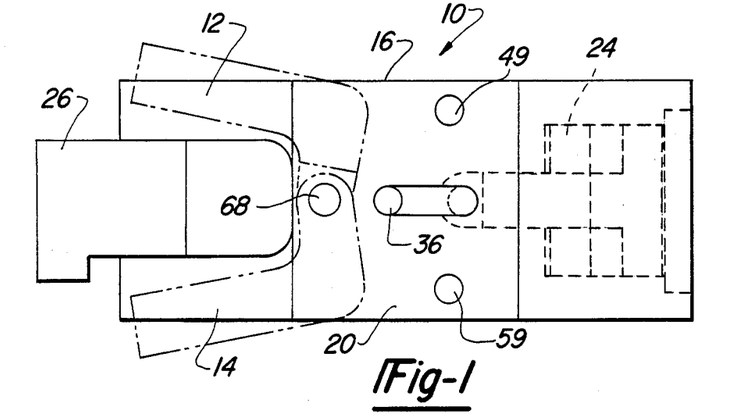
FIG. 1 is a front elevation view of the compound toggle robotic gripper of the present invention.
Figure 2:
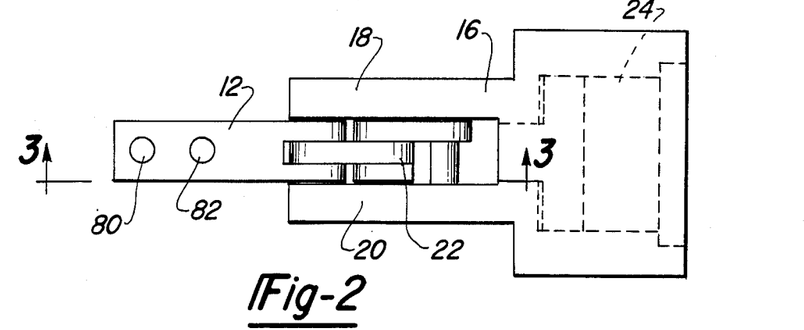
FIG. 2 is a top plan view of the robotic gripper shown in FIG. 1.

Referring to FIGS. 1 and 2, the compound toggle robotic gripper of the present invention, generally designated as 10, comprises a pair of spaced, opposed gripping jaws 12, 14, pivotally mounted on a base 16, preferably including a pair of parallel, spaced apart side walls 18, 20 between which the gripping jaws 12, 14 and a compound toggle mechanism 22 are mounted. An actuator, preferably in the form of a hydraulic cylinder-piston assembly 24 is operably connected to the compound toggle mechanism 22 for shifting the toggles in the mechanism 22 from their folded, released positions overcenter to locked positions, thereby moving the gripping jaws 12, 14 from an unclamped position to a clamped position with the workpiece 26 clamped therebetween.

Figure 3:
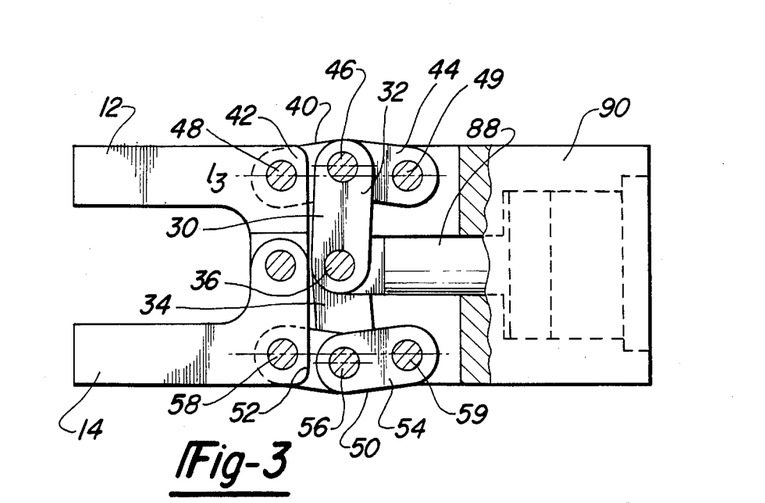
FIG. 3 is an elevation view in partial cross-section along the plane 3—3 shown in FIG. 2.

Referring now to FIG. 3, the compound toggle mechanism in the preferred embodiment comprises a first toggle 30 including first and second toggle links 32 and 34 pivotally joined by a pin 36 at one end. A second toggle 40 includes third and fourth links 42 and 44 which are likewise pivotally joined at one end by a pin 46. The first link 32 of the first toggle 30 is also pivotally joined to the second toggle 40 by the pin 46. The other end of the third link 42 is pivotally joined to the first gripping jaw 12 by a pin 48, and the other end of the fourth link 44 is pivotally joined to the base 16 by a pin 49, which is preferably secured to each of the side walls 18 and 20.

A third toggle 50 includes fifth and sixth links 52 and 54 pivotally joined at one end by a pin 56 which also pivotally joins the other end of the second link 34 of the first toggle 30 thereto. The other end of the fifth link 52 is pivotally joined to the second gripping jaw 14 by a pin 58, and the free end of the sixth link 54 is pivotally joined to the base 16 by a pin 59 which is preferably secured to each of the side walls 18 and 20.

It should be noted that pins 49 and 59 are fixedly mounted in side plates 18 and 20 and extend therebetween. Pins 46 and 56 are fixedly mounted in the first link 32 and second link 34 of the first toggle 30 respectively and extend through third link 42 and fourth link 44 and fifth link 52 and sixth link 54 respectively, each respective pair of links being freely pivotal about their respective pins 46 and 56. As will be appreciated by those skilled in the art, and as evidenced by comparison of the locked condition of FIG. 3 with the unlocked condition of FIG. 4, extension of the actuating member 88 from the housing 90 containing the hydraulic cylinder-piston assembly 24 urges the first toggle 30 from its folded, released position (shown in FIG. 4) to a locked position (shown in FIG. 3). Movement of the first toggle 30 in this manner likewise urges each of the second and third toggles 40 and 50 from their folded, released positions into locked positions.

Figures 4, 5:
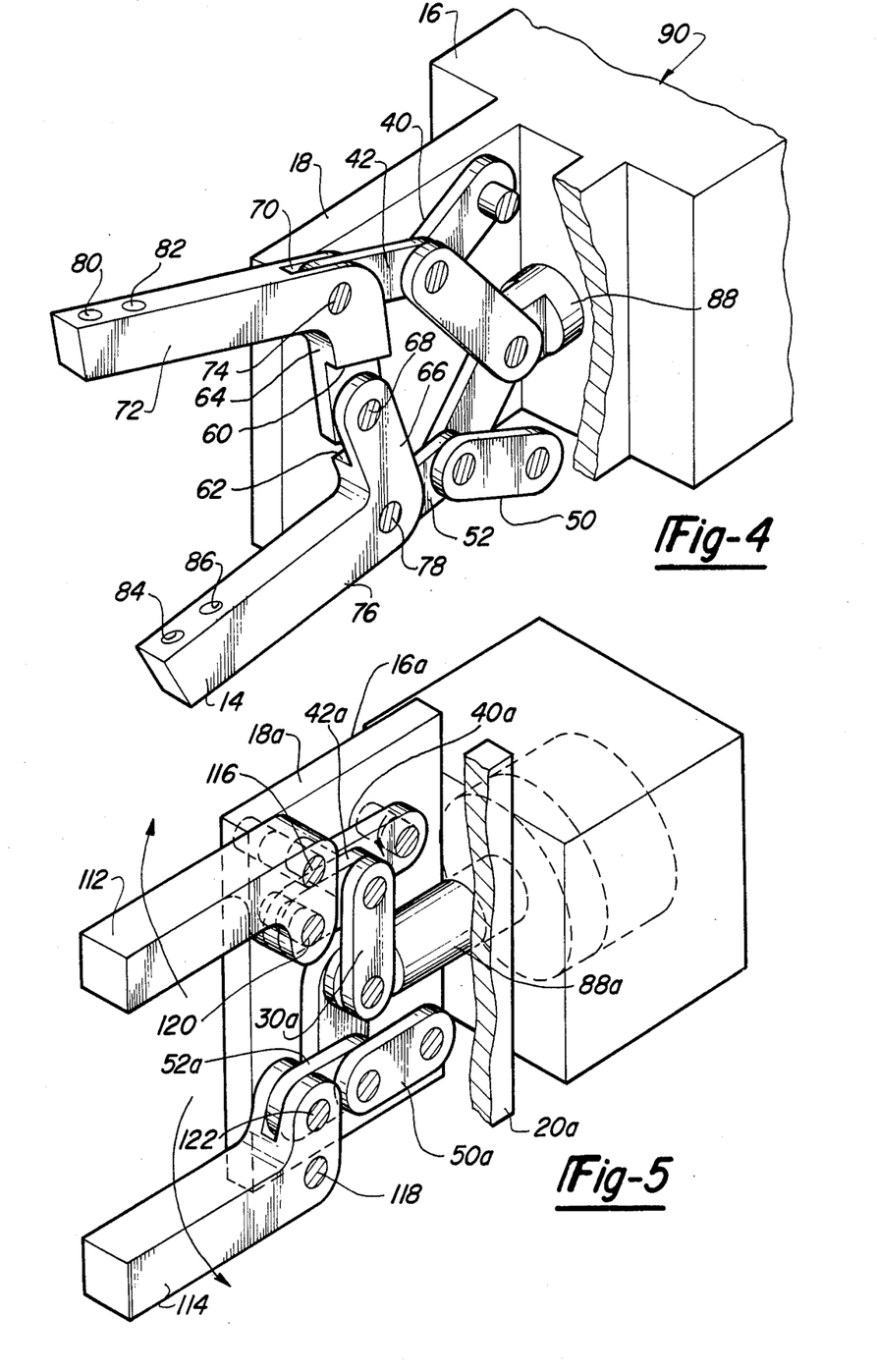
FIG. 4 is a perspective view in partial cross-section along the plane 3—3 shown in FIG. 2 of the gripper in a released position.
FIG. 5 is a perspective view in partial cross-section along the plane 3—3 shown in FIG. 2 of an alternative embodiment gripper which locks in the opened position.

It should be noted that the preferred locked position for each of the toggles 30, 40 and 50 finds the pivoting points of the toggles, at pins 36, 46 and 56 respectively, translated slightly overcenter of the line defined by the center of the pins 46 and 56, 48 and 49, and 58 and 59 at the ends of each of the toggles. For example, the pivotally joined ends of the third and fourth links 42 and 44 of the second toggle 40 (located at pin 46) move from a position below line $l_3$ in the released position overcenter to a position just above line $l_3$ when the toggle 40 is in its locked position.

As will be appreciated by those skilled in the art, location of the pivot points of the toggles 30, 40, and 50 slightly overcenter ensures that, in the event of a sudden loss of pressure in the hydraulic cylinder-piston assembly 24, the gripper 10 will remain in the locked position. In fact, an opposite force causing a retraction of the actuating member 88, is necessary to cause movement of the pivoting point of the first toggle 30 back overcenter towards its folded, released position, also causing each of the pivot points of the second and third toggles 40 and 50 to move back overcenter from their locked positions towards their folded, released positions thereby releasing the first and second gripping jaws 12 and 14 from their clamped condition.

The first and second gripping jaws 12 and 14 are preferably generally L-shaped members. As shown in FIG. 4, the first and second jaws 12 and 14 preferably include complimentary L-shaped recesses 60, 62 respectively in the legs 64 and 66 of the first and second gripping jaws 12 and 14. The legs 64 and 66 of the first and second gripping jaws 12 and 14 are pivotally joined by a pin 68 which is fixedly secured in side plates 18 and 20 of the base 16.

As previously described, the first and second jaws 12 and 14 are pivotally connected to the other ends of the third link 42 of the second toggle 40 and the fifth link 52 of the third toggle 50 respectively. In the preferred embodiment, toggle link 42 is secured within a slotted portion 70 located at the juncture of the leg 64 and arm 72 of the first jaw 12 by a pin 74. Similarly, toggle link 52 of the third toggle 50 is pivotally secured within a slotted portion (not shown) located at the juncture of the leg 66 and arm 76 of the second jaw 14 by a pin 78. The arms 72 and 76 of the first and second jaws 12 and 14 may include one or more tapped holes 80–86 to provide means for attachment on the outer surface of the arms 72 and 76 of auxiliary members for holding parts of greater widths or diameters than the distance between the inner surfaces of the arms 72 and 76.

FIG. 5 illustrates an alternative embodiment of the present invention wherein extension of the actuating member 88a, and the resulting movement of the first, second and third toggles 30a, 40a, and 50a, causes an outward movement of first and second gripping jaws 112 and 114 towards their clamped positions. It will be noted that, except for variations noted hereinafter, this embodiment is identical to the above described embodiment, and, to this end, the reference numbers of corresponding components are identical with the exception of the addition of the letter a at the end of the reference numeral.

A reverse motion of the first and second gripping jaws 112 and 114 from that of the above described embodiment is attained by reversing the location of the pivot points of the first and second gripping jaws 112 and 114 relative to where the first and second gripping jaws 112 and 114 are pivotally joined respectively to the third link 42a and fifth link 52a of the second and third toggles 40a and 50a. Thus, the pin 116 which pivotally joins the first gripping jaw 112 to each of the side walls 18a and 20a of the base 16a is located outside of the pin 120 which pivotally joins the third link 42a of the second toggle 40a to the first gripping jaw 112. In a similar manner, the pin 118 which pivotally joins the second gripping jaw 114 to each of the side walls 18a and 20a of the base 16a is located outside of the pin 122 which pivotally joins the fifth link 52a on the third toggle 50a to the second gripping jaw 114.

Thus, movement of the second toggle 40a from its folded, released position to an extended locked position causes the first gripping jaw 112 to rotate outward (clockwise) about the pin 116 upon which it is mounted to the base 16a. Likewise, extension of the third toggle 50a from its folded, released position to an extended locked position causes outward (counterclockwise) motion of the second gripping jaw 114 about the pin 118 upon which it is mounted.

Figure 6:
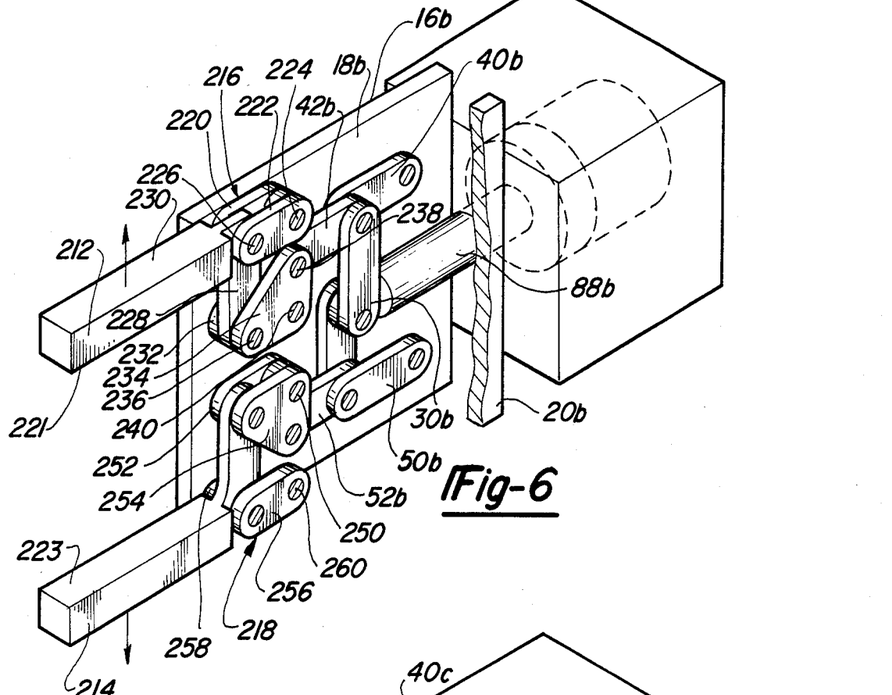
FIG. 6 is a perspective view in partial cross-section along the plane 3—3 shown in FIG. 2 of an alternative embodiment of the present invention.

FIG. 6 illustrates an alternative embodiment of the robotic gripper shown in FIGS. 1–3 in which each of the first and second gripping jaws 212 and 214 are pivotally mounted on first and second sets of pivoting members 216 and 218 respectively to ensure that the gripping surfaces 221 and 223 of each of the first and second gripping jaws 212 and 214 remain parallel to each other throughout the entire range of their motion from an open, unclamped position to a relatively closed, clamped position. Again, elements common to the embodiment shown in FIGS. 1-3 are shown with identical reference numerals followed by the letter b.

The first set of pivoting members 216 preferably includes a pair of upper links 220 and 222 each pivotally joined to the base 16b by a pin 224 which is fixed to one or both of the side walls 18b and 20b of the base 16b. The other ends of the upper links 220 and 222 are pivotally joined by a pin 226 to the first gripping jaw 212 at the juncture of the leg 228 and arm 230 of the first gripping jaw 212.

A pair of triangular members 232 and 234 are pivotally joined to the lower end of the leg 228 of the first gripping jaw 212 by a pin 236. Pin 236 joins the triangular members 232 and 234 at one of the acute angled corners of the triangular members 232 and 234 which are generally shaped as right triangles. The other acute angled corner of the triangular members 232 and 234 are each joined to the third link 42b of the second toggle 40b by a pin 238. The right angled corner of the triangular members 232 and 234 is pivotally mounted to the base 16b by a pin 240 which preferably extends through each of the triangular members 232 and 234 and is fixedly secured to each of the side walls 18b and 20b of the base 16b. It should be noted that each of pins 224 and 240 are fixed to the base 16b so that displacement of the third link 42b of the second toggle 40b resulting from extension or retraction of the actuating member 88b will cause rotation of the triangular members 232 and 234 about the longitudinal axis of the pin 240, and rotation of the upper links 220 and 222 about the longitudinal axis of the pin 224.

The second set of pivoting members 218 similarly interconnects the second gripping jaw 214 with the fifth link 52b of the third toggle 50b. Again, it should be noted that the pin 250 which pivotally connects each triangular member 252 and 254 to the base 16b, is preferably fixed to each of the side walls 18b and 20b of the base 16b resulting in rotation of the triangular members 252 and 254 about the longitudinal axis of the pin 250 in a manner similar to the rotation described above in connection with triangular members 232 and 234. Likewise, the bottom links 256 and 258 are pivotally joined to pin 260 which is preferably fixed to each of the side walls 18b and 20b of the base 16b, resulting in rotation about the longitudinal axis of the pin 260 in a manner similar to that described.

Movement of the actuating member 88b and each of the first, second and third toggles 30b, 40b and 50b from their released positions to their locked positions will therefore result in rotation of each of the triangular members 232 and 234 and the upper links 220 and 222 about their fixed axes 224 and 240 in a counterclockwise direction and resulting downward motion of the first gripping jaw 212. At the same time, each of the triangular members 252 and 254 and lower links 256 and 258 (not shown) in the second set of pivoting members 218 will rotate in a clockwise direction about their pivoting axes 250 and 260 respectively, resulting in upward motion of the second gripping jaw 214 towards the downwardly moving first gripping jaw 212 in a parallel fashion towards a clamped position.

It will be appreciated by those skilled in the art that when the first and second gripping arms 212 and 214 are mounted to the first and second sets of pivoting members 216 and 218 as described above, extension of the actuator member 88b and the concommittant movement of each of the first, second and third toggles 30b, 40b and 50b from their released positions to their locked positions will result in a generally parallel movement of the gripping jaws 212 and 214 from their unclamped to their clamped positions.

Figure 7:
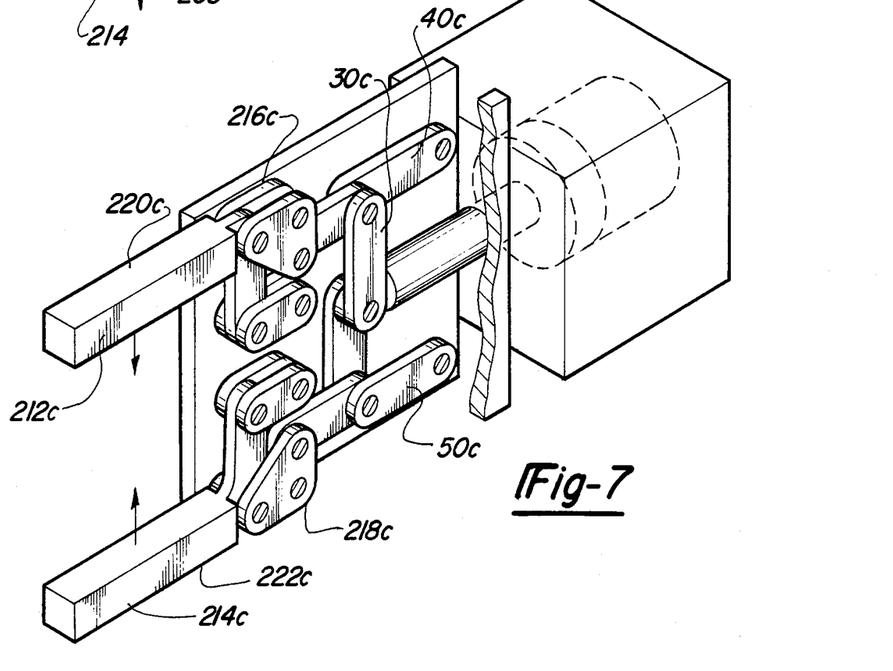
FIG. 7 is a perspective view in partial cross-section along the plane 3—3 shown in FIG. 2 of another alternative embodiment of the present invention.

FIG. 7 illustrates an embodiment of the robotic gripper 10 of the present invention shown in FIGS. 1-3 in which each of the first and second gripping jaws 212c and 214c are pivotally mounted on first and second sets of pivoting members 216c and 218c respectively to ensure that the gripping surfaces 220c and 222c generally remain parallel to each other the entire range of their motion from a relatively closed, unclamped position to a relatively open, clamped position. As will be appreciated by those skilled in the art, reversal of the parallel motion of each of the gripping jaws 212c and 214c as a result of movement of each of the first, second and third toggles 30c, 40c and 50c from their released positions to their locked positions is accomplished by reorienting each of the first and second sets of pivoting members 216c and 218c in the manner shown in FIG. 7.

Figure 8:
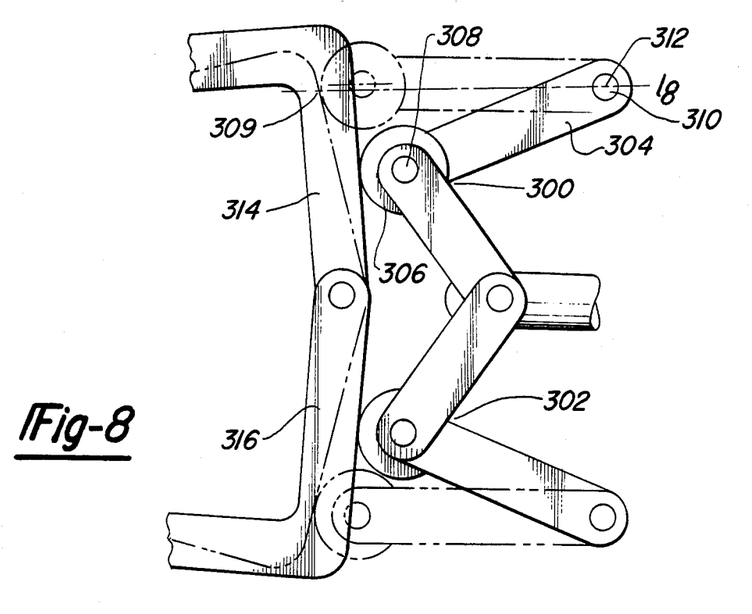
FIG. 8 is a partial side view of an alternative embodiment of toggle mechanism of the present invention and FIG. 9 is a perspective view in partial cross-section of another alternative embodiment of the present invention.
Figure 9:
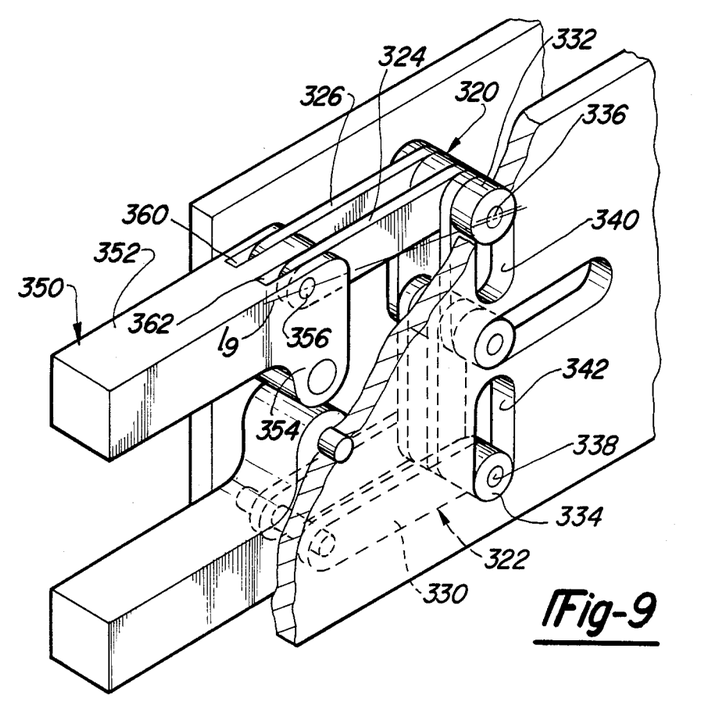

Referring now to FIGS. 8 and 9, it will be appreciated by those skilled in the art that the double link toggles utilized in the embodiments shown in FIGS. 1-7 can be replaced by other equivalent toggle mechanisms known in the art, such as roller toggles 300 and 302. Roller toggle 300 comprises a toggle link 304 and a roller 306 pivotally connected at one end of the toggle link 304 and at the center of the roller 306 by a pin 308. The other end of the toggle link 304 is pivotally connected to the base 310 by a pin 312. Each of roller toggles 300 and 302 reach their locking position at the point shown by the dashed figures. For example, roller toggle 300 is locked when the center of the pin 308 moves just past a line 18 drawn from the center of the pin 312 to the point of contact 309 of the roller 306 with the surface of the first gripping jaw 314.

An alternative form of roller toggle 320 which may be used in place of the double link toggles employed in the embodiments of FIGS. 1-7 or the roller toggles 300 and 302 of FIG. 8 are shown in FIG. 9. These toggles 320 and 322 each include a link 324 and 330 each respectively pivotally connected at one end to the center of a roller 332, 334 by a pin 336, 338. In the embodiment shown in FIG. 9, the rollers 332 and 334 are each joined in slots 340 and 342 respectively.

Figure 10:
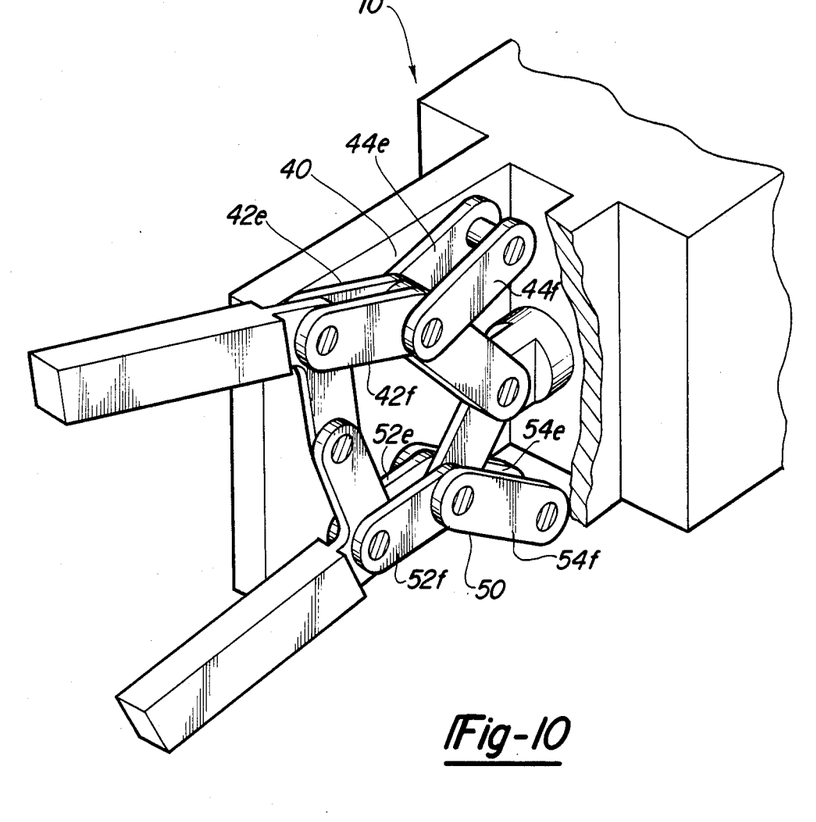
FIG. 10 is a perspective view in partial cross-section of an alternative embodiment of toggle mechanism of the present invention.

In this embodiment, the first arm of the roller toggle 320 includes a pair of generally parallel links 324 and 326. As will be appreciated by those skilled in the art, employing a pair of links 324 and 326 as one of the arms of the toggle mechanism increases the stability of the mechanism. Similarly, each of the links 32, 34, 42, 44, 52, and 54 which serve as arms of the double link toggles 30, 40, and 50 in the embodiments of FIGS. 1-7 may themselves be replaced by pairs of links such as links 324 and 326 in order to increase the stability of the compound toggle mechanism. As shown in FIG. 10, each of the arms of toggle 40 may include a pair of parallel, generally planar links, with links 42e and 42f comprising one arm of the toggle, and links 44e and 44f comprising the other arm of the toggle. Similarly, each of the arms of toggle 50 employs a pair of generally parallel links with links 52e and 52f forming one arm of toggle 50 and links 54e and 54f forming another arm of toggle 50.

It will also be appreciated by those skilled in the art that the hydraulic cylinder piston assembly of the preferred embodiment can be replaced by other commercially available actuators capable of providing the necessary force without departing from the spirit of the invention.

Referring again to FIG. 9, each of the links 324 and 326 are pivotally connected at the junction of the arm portion 352 and the leg portion 354 of the first gripping jaw 350 by a pin 356. In the preferred embodiment, each of the links 324 and 326 are pivotally mounted within slots 360 and 362 in the first gripping jaw 350. The other ends of the links 324 and 326 of the toggle 320 are pivotally joined to a roller 332 at the center of the roller by a pin 336. It will be appreciated by those skilled in the art that the roller toggle 320 reaches its locked position when the center of the pin 336 is positioned just above a line $l_9$ drawn from the center of the pin 356 to the point of contact of the roller 332 with the opposite wall of the slot 340.

Thus, the compound toggle robotic gripper of the present invention is relatively simple and lightweight in construction, yet provides substantially improved gripping capability as compared to existing robotic gripping mechanisms. As will be appreciated by those skilled in the art, roller toggles of the types shown in FIGS. 8 and 9, as well as other equivalent toggles, may be substituted for any of the toggles in the compound toggle mechanism of the present invention without departing from the spirit of the invention.

What is claimed is:

1. A robotic gripper comprising:
   a pair of spaced, opposed gripping jaws each pivotally mounted to a base;
   a compound toggle mechanism comprising
     a first toggle including first and second arms pivotally joined at one end for movement from a released position to a locked position,
     a second toggle including third and fourth arms pivotally joined at one end and operably connected to the free end of the first arm for movement from a released position to a locked position, the free end of the third arm operably connected to one of the gripping jaws, the free end of the fourth arm operably connected to the base, and
     a third toggle including fifth and sixth arms pivotally joined at one end and operably connected to the free end of the second arm for movement from a released position to a locked position, the free end of the fifth arm operably connected to the other gripping jaw, the free end of the sixth arm operably connected to the base; and
   an actuator operably connected to the first toggle for shifting the first, second and third toggles from their respective released positions to their respective locked positions, thereby moving the gripping jaws from an unclamped position to a clamped position.

2. The robotic gripper of claim 1 wherein each of the first, second and third toggles are configured so that each toggle is simultaneously shifted from its released position to its locked position.

3. The robotic gripper of claim 1 wherein the arms of the toggles are generally planar links.

4. The robotic gripper of claim 1 wherein at least one of the arms of the first, second and third toggles comprises a pair of generally parallel links.

5. The robotic gripper of claim 1 wherein the actuator is a hydraulic cylinder-piston assembly.

6. The robotic gripper of claim 1 wherein each of the gripping jaws includes an arm having a gripping surface, and a leg joined at one end to the arm, and wherein each of the gripping jaws is pivotally mounted to the base at the other end of the leg, and wherein the third arm and fifth arm are operably connected to their respective gripping jaws at the end of the leg adjoining the arm of their respective gripping jaw.

7. The robotic gripper of claim 1 wherein each of the gripping jaws includes an arm having a gripping surface, and a leg joined at one end to the arm, and wherein each of the gripping jaws is pivotally mounted to the base at the end of the leg adjoining the arm and wherein the third arm and fifth arm are operably connected to their respective gripping jaws at the other end of the leg of that respective gripping jaw.

8. A robotic gripper comprising:
   a pair of spaced, opposed gripping jaws, each pivotally mounted on a base;
   a compound toggle mechanism comprising
     a first toggle including first and second links pivotally joined at one end for movement from a folded, released position overcenter to a locked position,
     a second toggle including third and fourth links each pivotally joined at one end to the free end of the first link, for movement from a folded, released position overcenter to a locked position, the free end of the third link pivotally joined to one of the gripping jaws, the free end of the fourth link pivotally joined to the base, and
     a third toggle including fifth and sixth links each pivotally joined at one end to the free end of the second link, for movement from a folded, released position overcenter to a locked position, the free end of the fifth link pivotally joined to the other gripping jaw, and the free end of the sixth link pivotally joined to the base,
   an actuator for shifting the toggles from their folded, released positions overcenter to locked position, thereby moving the gripping jaws from an unclamped position to a clamped position.

9. A robotic gripper comprising:
   a base;
   a first generally L-shaped gripping jaw having an arm and a leg, the arm including a first gripping surface, and the leg being joined at the arm at one end and pivotally joined to the base at its opposite end;
   a second generally L-shaped gripping jaw having an arm and a leg, the arm including a first gripping surface, and the leg being joined at the arm at one end and pivotally joined to the base at its opposite end;
   a compound toggle mechanism comprising
     a first toggle including first and second links pivotally joined at one end for movement from a folded, released position overcenter to a locked position,
     a second toggle including third and fourth links each pivotally joined at one end to the free end of the first link, for movement from a folded, released position overcenter to a locked position, the free end of the third link pivotally joined to the first gripping jaw at the end of the leg adjoining the arm, the free end of the fourth link pivotally joined to the base, and
     a third toggle including fifth and sixth links each pivotally joined at one end to the free end of the second link, for movement from a folded, released position overcenter to a locked position, the free end of the fifth link pivotally joined to the second gripping jaw at the end of the leg adjoining the arm, and the free end of the sixth link pivotally joined to the base, an actuator for shifting the toggles from their folded, released positions overcenter to locked position, thereby moving the gripping jaws from an unclamped position to a clamped position.

10. A robotic gripper comprising:

a base;

a first generally L-shaped gripping jaw having an arm and a leg, the arm including a first gripping surface, and the leg being joined at the arm and pivotally joined to the base at one end;

a second generally L-shaped gripping jaw having an arm and a leg, the arm including a first gripping surface, and the leg being joined at the arm and pivotally joined to the base at one end;

a compound toggle mechanism comprising a first toggle including first and second links pivotally joined at one end for movement from a folded, released position overcenter to a locked position, a second toggle including third and fourth links each pivotally joined at one end to the free end of the first link, for movement from a folded, released position overcenter to a locked position, the free end of the third link pivotally joined to the first gripping jaw at the end of the leg opposite the end adjoining the arm, the free end of the fourth link pivotally joined to the base, and a third toggle including fifth and sixth links each pivotally joined at one end to the free end of the second link, for movement from a folded, released position overcenter to a locked position, the free end of the fifth link pivotally joined to the second gripping jaw at the end of the leg opposite the end adjoining the arm, and the free end of the sixth link pivotally joined to the base, an actuator for shifting the toggles from their folded, released positions overcenter to locked position, thereby moving the gripping jaws from an unclamped position to a clamped position.

* * * * *